J. T. ROSS.
WATER POWER.
APPLICATION FILED APR. 25, 1912.
1,049,606.
Patented Jan. 7, 1913.
3 SHEETS—SHEET 1.
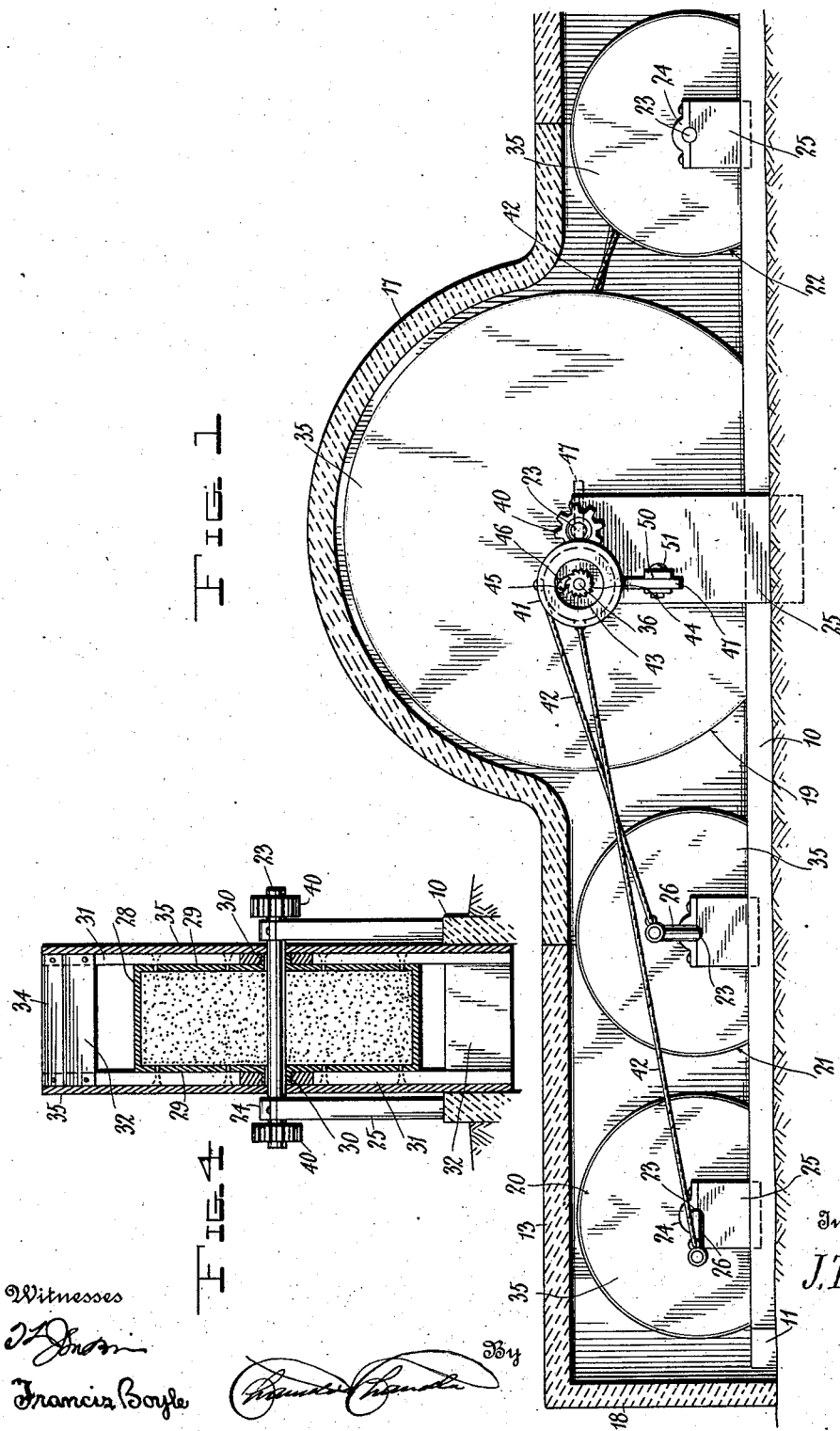
Witnesses
Inventor
J. T. Ross,
By
Attorneys J. T. ROSS.
WATER POWER.
APPLICATION FILED APR. 25, 1912.
1,049,606.
Patented Jan. 7, 1913.
3 SHEETS—SHEET 2.
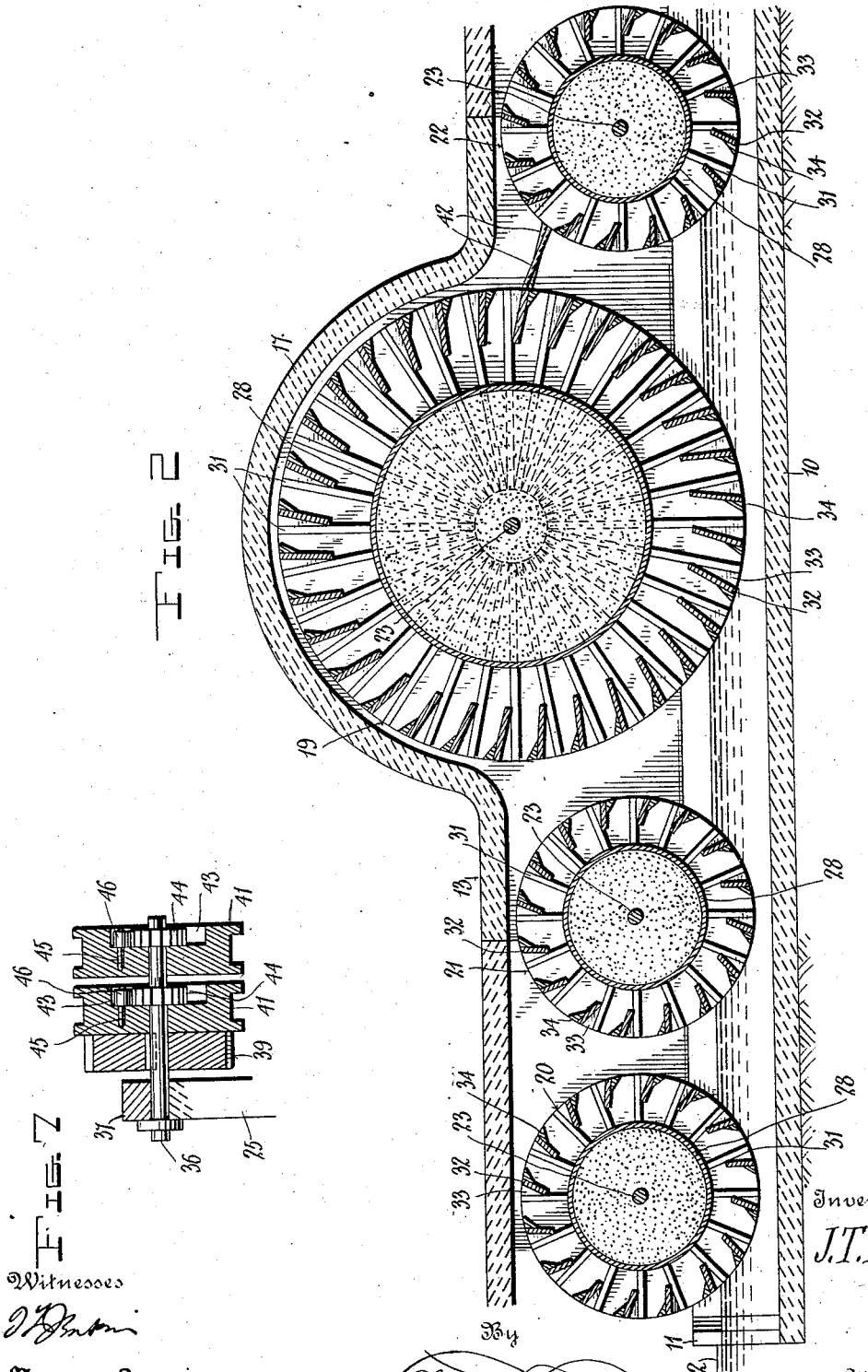

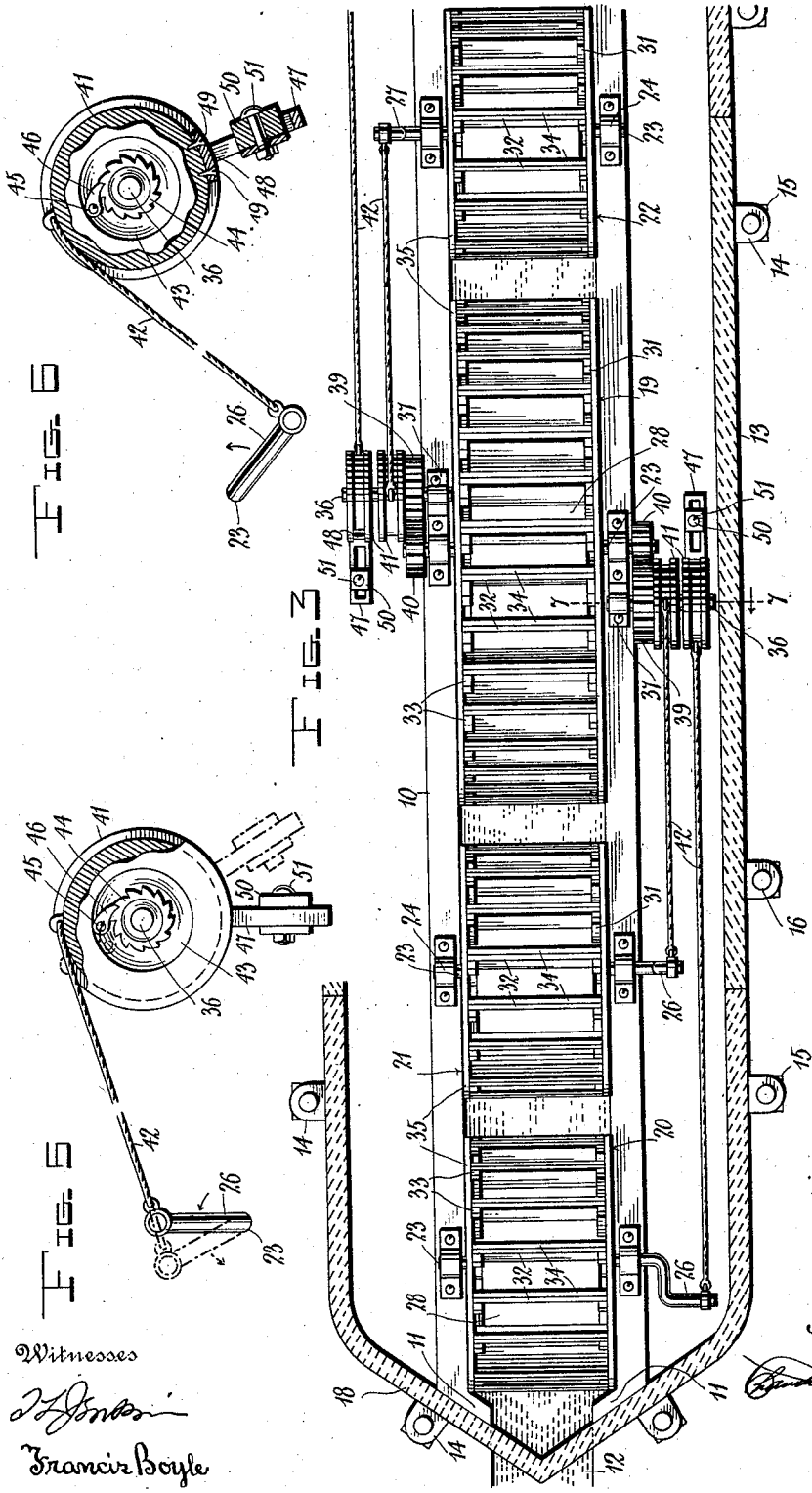
J. T. ROSS.
WATER POWER.
APPLICATION FILED APR. 25, 1912.
1,049,606. Patented Jan. 7, 1913.
3 SHEETS—SHEET 3.
Witnesses
Inventor
J. T. Ross,
Attorneys

UNITED STATES PATENT OFFICE.

JAMES THOMAS ROSS, OF ELDORADO, OKLAHOMA, ASSIGNOR OF FIVE ONE-HUNDREDTHS TO N. A. WARREN, FIVE ONE-HUNDREDTHS TO W. F. SLAUGHTER, AND TEN ONE-HUNDREDTHS TO HOWARD McBRIDE, ALL OF IDABEL, OKLAHOMA, AND TEN ONE-HUNDREDTHS TO T. J. NICHOLS, TWENTY ONE-HUNDREDTHS TO D. T. SLEDGE, FIFTEEN ONE-HUNDREDTHS TO J. E. MARKHAM, TEN ONE-HUNDREDTHS TO E. R. THOMAS, AND TEN ONE-HUNDREDTHS TO JOHN D. HIX, ALL OF DUNCAN, OKLAHOMA.

WATER-POWER.

1,049,606.  Specification of Letters Patent.  Patented Jan. 7, 1913.

Application filed April 25, 1912. Serial No. 693,179.

*To all whom it may concern:*

Be it known that I, JAMES T. ROSS, a citizen of the United States, residing at Eldorado, in the county of Jackson, State of Oklahoma, have invented certain new and useful Improvements in Water-Powers; and I do hereby declare the following to be a full, clear, and exact description of the invention, such as will enable others skilled in the art to which it appertains to make and use the same.

This invention relates to water powers designed for operation in irrigation ditches or the like where the volume of water is limited.

An object of the present invention is to provide a main water wheel, and a plurality of supplemental water wheels mounted in advance and in rear of the main wheel, each supplemental wheel being mounted on a crank shaft which imparts movement to the main water wheel through the instrumentality of a novel ratchet and pawl mechanism.

A further object of the invention is to provide a wheel house for all the water wheels that will have a novel end wall which prevents an abnormal amount of water entering the wheel flume in case of an overflow from the irrigating ditch.

With the above objects in view the invention consists in certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of a water power embodying my improvements with the wheel house shown in section. Fig. 2 is a longitudinal sectional view through the water power. Fig. 3 is a plan view of the water power with the wheel house in section. Fig. 4 is a cross sectional view through the main wheel and flume. Fig. 5 is a side elevation of a ratchet and pawl mechanism. Fig. 6 is a side elevation of the ratchet and pawl mechanism showing the parts in a different position from that shown in Fig. 5. Fig. 7 is a cross sectional view taken on the line 7—7 Fig. 3.

Referring now to the drawings in which like characters of reference designate similar parts, 10 designates a trough or flume formed preferably of hardened plastic material such as cement or the like, this flume being U-shape in cross section and having the leading ends of its side walls directed inwardly as shown at 11 to provide a constricted intake end for the flume, which communicates with the irrigating ditch 12. The flume is housed over by an inverted U-shaped housing 13 the side walls of which bear upon the ground and are provided with orificed ears 14 through which and posts 15 embedded in the ground are passed anchoring bolts 16 or the like. The top wall of the housing is spaced a sufficient distance above the ground to house over supplemental wheels which will be presently described, and is furthermore bowed upwardly as shown at 17 to house over the main wheel which also will be presently described. The leading end wall 18 of the housing is bowed outwardly to conform to the constricted intake of the flume, and forms a baffle or deflector wall the lower edge of which is flush with the normal level of the water in the irrigating ditch so that in case of an abnormal amount of water flowing down the ditch, the excess water will be deflected by the wall over the banks of the ditch. In this manner the water level within the flume is maintained constant at all times. The housing 13 or wheel house as it will be hereinafter referred to is preferably formed of hardened plastic material such as cement or the like.

The main wheel is designated in general by the numeral 19 and the supplemental wheels by the numerals 20, 21 and 22, and since all of the wheels are identical in construction but one will be described in detail. It will here be stated that the supplemental wheels are of less diameter than the main wheel and are arranged in advance of and in rear of the main wheel, and there may be any desired number of these supplemental wheels, three supplemental wheels being shown in the present instance for brevity. All of the wheels are mounted on axles 23 which are journaled in suitable bearing boxes 24 supported upon posts 25 which may be formed of any desired material and are preferably embedded in the top edges of the flume. The shafts of the supplemental wheels in advance of the flume terminate in cranks 26 which are arranged upon the same side of the flume, and the shaft of the supplemental wheel which is arranged in rear of the main wheel terminates in a crank 27 which is arranged upon the opposite side of the flume.

Each wheel comprises a closed cylindrical drum 28 the circular ends 29 of which are provided with cylindrical flanges 30 which are keyed to the wheel shaft. This drum is designed to be filled with sand or other ballast to increase the weight of the wheel so that when the wheel is once started its momentum will promote the smooth running of the wheel. Arranged radially and in pairs on the circular ends of the drum are spokes 31, the outer ends of which are connected by blades 32, it being understood that the spokes are of sufficient length to permit of the blades extending to nearly the bottom of the flume. In order that the blades may be tilted in a direction opposite to the direction of rotation of the wheel, a wedge-shaped spacing block 33 is interposed between each blade and its supporting spokes, and further a wedge-shaped block 34 is fixed to the working face of the blade near the edge of the blade. By this construction, the face of the blade against which the water exerts its force, is not radially disposed as would be the case were the blade fixed directly to its supporting spokes, but rather is disposed in planes which intersect the circumference of the drum without passing through the center of the drum. Thus a compartment or bucket is formed between the working face of a blade 32, the wedge-shaped block 34 on the working face of the blade, and the wedge-shaped spacing block 33 of the next succeeding blade. Secured to the outer edges of the spokes are circular walls 35 which coöperate with the blades and wedge-shaped blocks in forming the above described buckets.

For transmitting the rotary movement of the supplemental wheels to the main wheel, stub shafts 36 are arranged on opposite sides of the main wheel. By now referring to Fig. 7, it will be seen that each stub shaft is journaled at one end in a suitable bearing box 37 supported by the adjacent post 25 which supports the main wheel shaft. Fixed to the stub shaft near its secured end is a spur gear 39 which meshes with a spur gear 40 fixed upon the adjacent end of the main wheel shaft. Loose drums 41 are mounted on the stub shaft, one drum for each supplemental wheel. A flexible cable 42 is secured to the periphery of each drum and to the crank of the related supplemental wheel crank shaft. Formed in one side of each drum is a circular recess 43 and fixed to the shaft within this recess is a ratchet wheel 44. Loosely mounted on a pivot pin 45 arranged in the floor of the recess is a pawl 46.

Projecting radially from the periphery of each drum is a substantially rectangular frame 47, this frame being preferably formed in a single piece and being provided at one end with a foot 48 which is secured by securing screws 49 or the like to the periphery of the drum. A pair of metallic weight blocks 50 are arranged on opposite sides of the frame and are connected by a bolt 51 which projects through the frame and by means of which the weights may be shifted toward or away from the periphery of the drum.

Suppose that the crank of one of the supplemental wheel is in an upright position as shown in Fig. 5. During the initial stages of rotation of the crank in a counter-clockwise direction, the related loose drum will be rotated on its stub shaft, the pawl carried by the drum meanwhile loosely moving over the teeth of the ratchet wheel. During this movement of the drum, the weighted frame 47 of the drum will be moved upwardly. Now when the crank is moved through an arc of 180 degrees, and begins to ascend, the related cable will become slack, and the weighted frame will gravitate and cause the rotation of the drum in a clock-wise direction, the pawl of the drum during such rotation operatively engaging the teeth of the related ratchet wheel and imparting movement to the stub shaft which movement through the instrumentality of the mating spur gears is imparted to the shaft of the main wheel.

It is obvious that by mounting a great number of supplemental wheels in advance of and in rear of the main wheel, that the actuation of the main drive wheel due to the supplemental wheels may be made practically continuous since the ratchet and pawl mechanism of at least one supplemental wheel of the series will be active while the ratchet and pawl mechanisms of the remaining wheels are passive.

What is claimed, is:—

1. In a water power including in combination with a flume, a water wheel mounted to turn in said flume comprising a shaft, a closed drum fixed to said shaft, ballast in said drum, spokes arranged in pairs and extending radially beyond the periphery of said drum, a blade connecting the outer ends of each pair of spokes, a wedge-shaped spacing block interposed between the outer end of each blade and its supporting spokes, a second wedge-shaped block disposed on the working face of said blade, said second named block and the working face of said blade coöperating with the reverse face of the wedge shaped spacing block of the next succeeding blade in forming a bucket.

2. In a water power, a flume, a main water wheel mounted to turn therein, a supplemental wheel on one side of said main wheel, a crank assembled with said supplemental wheel, a stub shaft having a gear connection with the main wheel shaft, a ratchet wheel on said stub shaft, a loose drum on said stub shaft having a pawl connection with said ratchet wheel, a flexible connector between said crank imparting rotary movement to said drum in one direction, and a weight assembled with said drum imparting movement to the drum in an opposite direction.

3. A water power including a flume, a main wheel mounted to turn in said flume, a supplemental wheel mounted to turn in said flume, a crank assembled with the shaft of said supplemental wheel, a stub shaft operatively connected to the shaft on said main wheel, a ratchet wheel keyed to said stub shaft, a loose drum mounted to turn on said stub shaft and having a pawl connection with said ratchet wheel, a flexible connector secured to said crank and to said loose drum for imparting movement to the drum in one direction, a frame extending radially from the periphery of said drum, and a weight adjustably secured to said frame, said weight operating to limit movement of said drum in an opposite direction.

In testimony whereof, I affix my signature, in presence of two witnesses.

JAMES THOMAS ROSS.

Witnesses:
Jos. H. Blackwood,
Geo. H. Chandlee.

---

Copies of this patent may be obtained for five cents each, by addressing the "Commissioner of Patents, Washington, D. C."